Aug. 25, 1959　　　M. A. GILMAN　　　2,900,730
PROPORTION MEASURING DEVICE
Filed April 19, 1957　　　　　　　　　2 Sheets-Sheet 1

INVENTOR
MARVIN A. GILMAN
BY
ATTORNEY

Aug. 25, 1959 M. A. GILMAN 2,900,730
PROPORTION MEASURING DEVICE
Filed April 19, 1957 2 Sheets-Sheet 2

INVENTOR.
MARVIN A. GILMAN
BY
*Philip E. Hilbert*
ATTORNEY

United States Patent Office 2,900,730
Patented Aug. 25, 1959

2,900,730

PROPORTION MEASURING DEVICE

Marvin A. Gilman, Croton-on-Hudson, N.Y., assignor to Clay-Adams, Inc., New York, N.Y., a corporation of New York Application April 19, 1957, Serial No. 653,820

12 Claims. (Cl. 33—125)

This invention relates to a proportion measuring device, and more specifically, concerns a device for giving rapid, direct readings of the percentages of stratified layers of material contained within tubes of uniform cross section.

In considering samples of material made up of immiscible or otherwise stratified layers of liquid, or liquid-solid, it is frequently desirable to obtain percentage readings of one or more of the layers, particularly when the sample is contained in an uncalibrated, ungraduated tube. Thus, in making hematocrit determinations, where the blood sample is contained in a capillary tube, which is centrifuged to provide a lower layer of packed red cells, rapid and accurate readings of the proportion of the red cell column to the whole blood sample, are desirable.

Accordingly, an object of this invention is to provide a compact device for giving direct percentage readings of the stratified layers in a column of material contained in a tube; the tube and device being correlated and manipulated in a simple manner to give the desired reading.

A further object of this invention is to provide a device of the character described, wherein the movement of a marker to the demarcation point between stratified layers in a column of material coincidentally actuates a direct reading indicator to give an instantaneous percentage reading.

Sitll another object of this invention is to provide a device of the character described, which takes the form of a flat compact casing carrying a rotatable indicator dial bearing the percentage readings on the periphery thereof, together with a suitable geometric scale and associated marker movable over the scale for correlation with a sample tube also movable over the scale, wherein the movement of the marker in relation to the scale and demarcation points in the tube operates mechanism for effecting rotation of the indicator dial.

Still a further object of this invention is to provide a device of the character described which includes a pivoted marker having a limited proportioning angular movement, and a rotatable indicator dial having rotational movement proportioned to the angular movement of the marker whereby to substantially multiply the effect of the movement of the marker to produce clear, direct percentage readings by way of the indicator dial.

Other objects of this invention will in part be obvious and in part hereinafter pointed out.

In the drawings, Fig. 1 is a top plan view of the proportion measuring device embodying the invention;

Figure 1:
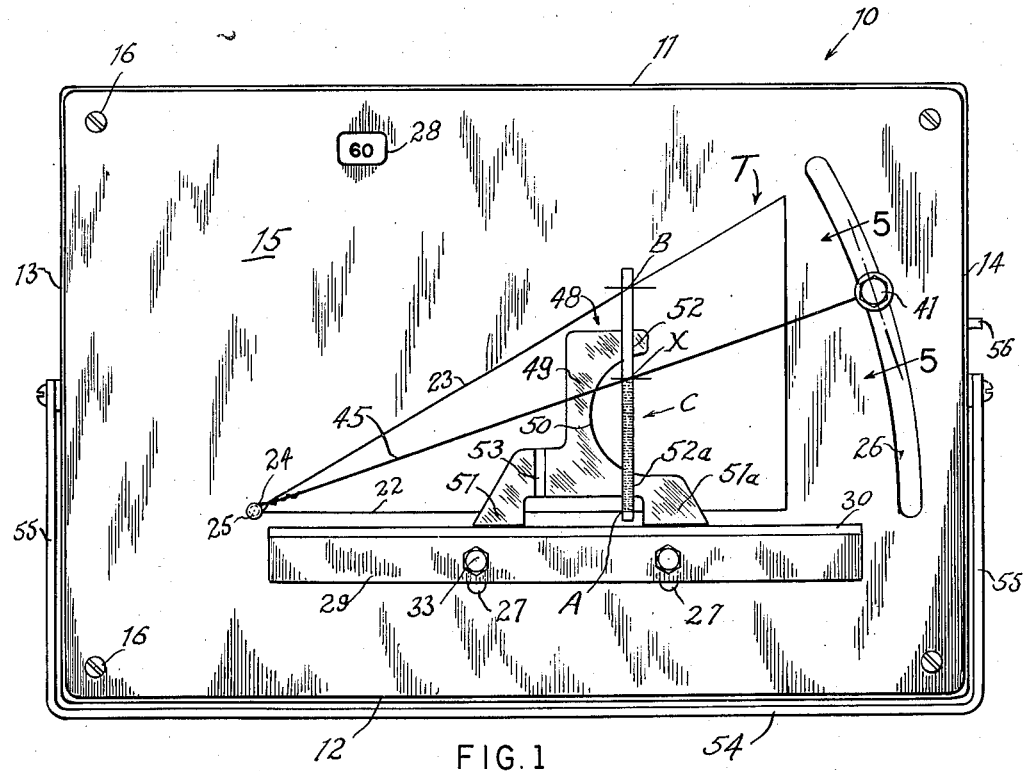

The device embodying the invention comprises essentially, a flat, hollow casing having a triangular figure or scale on the face plate thereof, together with a rotatable indicator dial interiorly thereof, a pivoted marker movable over the triangular scale, and a pivoted member interiorly of the casing having coincident movement with that of the marker, actuating means being provided within the casing for rotating the indicator dial in response to pivoted movement of the marker.

The device is to be used for measuring and giving direct percentage readings of stratified layers in a column of material carried within a tube which is movable over the triangular figure on the face plate to determined positions thereon for correlation of the pivoted marker with demarcation points between the stratified layers.

While the device is particularly useful for hematocrit determinations, wherein a blood sample in a capillary tube is centrifuged to produce a column of packed red cells at the lower end of the sample; the device can be used for percentage measurements of other stratified, columnar materials of the liquid-liquid, or liquid-solid type.

Referring in detail to the drawing, the device embodying the invention comprises a flat, rectangular shaped, hollow casing 10. Casing 10 includes side walls 11, 12 and end walls 13, 14, all in the form of an integral metal casting; a face plate 15 secured in place by screws 16; and a back plate 17 secured in place by screws passing through foot members 18 of rubber or the like.

Extending from the intersection of casing walls 12, 13 and diagonally thereof is a plate projection 19, for the purpose hereinafter appearing. Proection 19 is flush with the bottom edge portions of walls 12, 13. Extending forwardly from a central portion of casing wall 12 at the top edge theroef, are a pair of parallel slide receiving projections 20 formed with parallel guide recesses 21, for the purpose hereinafter appearing.

The face plate 15 has imprinted on the outer surface thereof a triangular figure T which may be a 30°–60° right triangle, with the horizontal side 22 disposed parallel to casing wall 12, the hypotenuse 23 extending diagonally of the plate, and apex 24 at the 30° angle adjacent casing wall 13. A short upstanding post 25 is fixed to plate 15 at apex 24. An arcuate slot 26 is formed in plate 15 adjacent casing wall 14, said slot being described about apex 24 as a center.

The plate 15 is further formed with a pair of short, parallel slots 27 extending toward triangle side 22 and respectively aligned with guide recesses 21 in projections 20; and with a window opening 28 adjacent casing wall 11, for the purpose hereinafter appearing.

Figure 6:
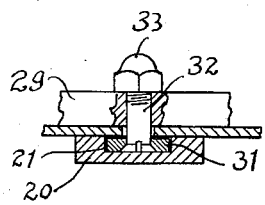
Fig. 6 is a sectional view taken on the line 6—6 of Fig. 3.
Figure 5:
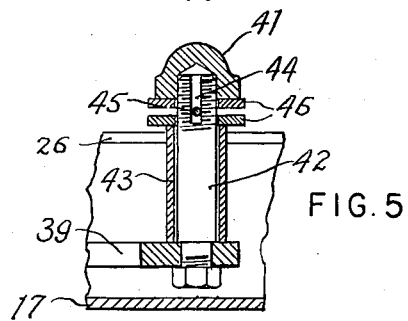
Fig. 5 is a partial sectional view taken on the line 5—5 of Fig. 1.

An elongated guide bar 29 with a bevelled forward edge 30 is movably mounted on the outer surface of plate 15 by means of slide members 31 on the under side of said plate and slidably received in recesses 21 of projections 20. A screw 32 and a nut 33 connects each slide member 31 with guide bar 29, as shown in Fig. 6. Thus the guide bar 29 is movable towards and away from triangle side 22.

Figure 3:
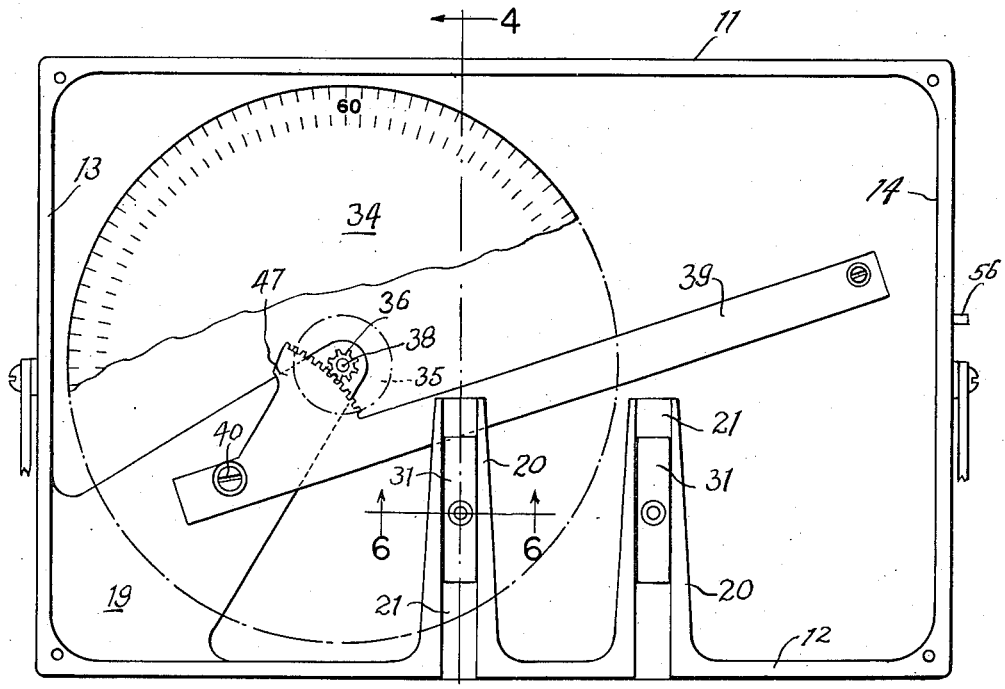
Fig. 3 is a top plan view of the device with the face plate removed.
Figure 4:
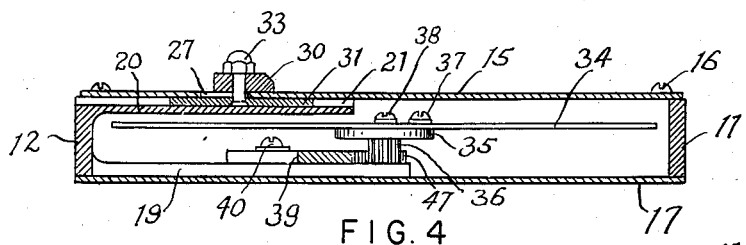
Fig. 4 is a transverse sectional view taken on the line 4—4 of Fig. 3.

Within casing 10 and on the left hand side thereof, looking at Fig. 3, there is rotatably mounted a circular indicator dial or disc 34 bearing on the outer marginal portions thereof spaced digits from 1 to 100 representing percentages, which appear on rotation of the dial, through window 28 in plate 15.

Indicator dial 34 is secured to a flange 35 on a pinion gear 36 by screws 37. The dial may be slotted arcuately at screws 37 to permit adjustment of the dial with respect to the flange 35. Pinion gear 36 rotates about a screw 38 threaded into a tapped opening at the outer end of plate 19.

An arm 39 is pivoted at one end to a pivot screw 40 received in a threaded opening in plate 19; the pivot screw 40 being vertically aligned with post 25 on plate 15. Arm 39 is actuated by means of a knob 41 secured to the free end thereof by a screw 42 bearing a collar 43 passing through slot 26 in plate 15. The upper end of screw 42 is slotted as at 44 to receive therein one end of a wire 45 forming a marker. Wire 45 is held in slot 44 by clamping washers 46 and knob 41. The other end of wire 45 is anchored to post 25. Thus, wire 45 has conjoint pivoted movement with arm 39 when actuated by knob 41.

The pivoted movement of arm 39 is translated to rotary movement of dial 34 by means of a sector gear 47 on arm 39 adjacent the pivoted end thereof, said sector gear meshing with pinion gear 36. The slot 26 has an angular extent permitting wire 44 to move between sides 22, 23 of figure T, in raised relation to the outer surface of plate 15.

In using the device of the instant invention, by way of example, for making a hematocrit determination, a capillary tube C containing a blood sample which has been previously centrifuged to produce a packed red-cell column, is placed in a carrier 48 of plastic or the like. Carrier 48, which is formed from a flat plate of material, includes an upright portion 49 having a circular edge 50 on one side thereof and laterally spaced legs 51, 51a at the lower end thereof. Aligned grooves 52, 52a are formed in upright portion 49 to receive tube C.

The column within tube C constituting the entire blood sample, extends from point A at the lower end thereof, to point B at the upper end thereof, X representing the demarcation point between the packed red-cell portion of the column and the remainder of the sample.

The carrier 48 and tube C thereon, is positioned on the outer surface of plate 15, beneath wire 45, with legs 51, 51a abutting the bevelled edge 30 of guide bar 29. The guide bar is then adjusted to bring point A in tube C in coincidence with side 22 of Figure T. The carrier 48 is then moved laterally along guide bar 29 until point B in tube C coincides with hypotenuse 23 of figure T.

The knob 41 is now manipulated to bring wire 45 in crossing relation to point X on tube C. Coincidentally with the movement of knob 41, dial indicator 34 will be rotated to show the percentage figure through window 28 corresponding to the angular position of wire 45 and arm 39.

The gear ratio between pinion 36 and sector gear 47 is such as to translate the total angular movement of arm 39 over 30° into a single revolution of dial 34. Furthermore, the spacing of the successive percentage indicia on dial 34 is suitably calibrated in accordance with corresponding positions of the wire 45 as it intersects verticals between triangle sides 22, 23, giving legible spacing between the indicia despite a rather limited angular movement of arm 39.

With the device of the instant invention, sample tubes C may be quickly mounted on carrier 48 and manipulated in a simple manner to give direct percentage readings by way of window 28. Carrier 48 may also be formed with a single vertical groove 53 for receiving relatively short capillary tubes sometime used in hermatocrit determinations. In this case, the device is used in a manner similar to that previously described.

Figure 2:
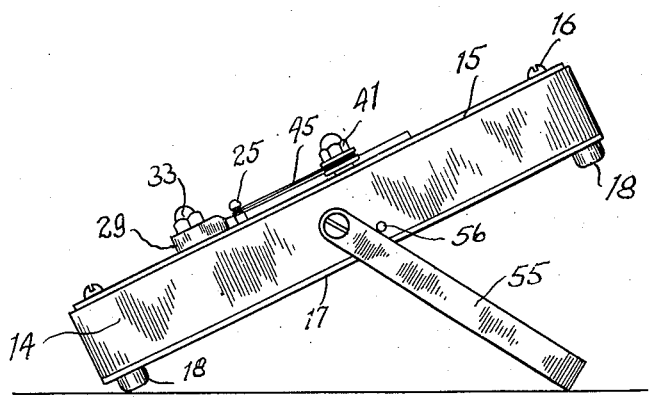
Fig. 2 is a side elevational view thereof in a tilted, reading position.

To further facilitate the use of the device, casing 10 may be provided with easel means in the form of a C-shaped member 54 having parallel arms 55 pivoted at midpoints of casing walls 13, 14. A stop pin 56 projecting from casing wall 14 slightly rearwardly of the pivot point of adjacent arm 55, allows member 54 to be swung from its normal position in close proximity to casing walls 12, 13, 14, as shown in Fig. 1, to an easel position shown in Fig. 2, thus presenting the device in tilted position, facilitating manipulation of tube C and the reading.

Obviously, the device of the instant invention could be used for proportion determinations of various materials, in stratified, columnar from, carried in tubes of uniform cross section.

As various changes might be made in the embodiment of the invention herein shown, without departing from the spirit thereof, it is understood that all matter shown or described herein shall be deemed illustrative and not by way of limitation except as set forth in the appended claims.

Having thus disclosed my invention, I claim as new and desire to protect by Letters Patent:

1. A device for measuring the relative proportions of at least two stratified layers of a column of material in a tubular container of uniform cross section, comprising a base, indicator means movably mounted adjacent said base, a triangular figure on one side of said base, an elongated member pivoted at one end thereof on the other side of said base at a point aligned with one vertex of said triangular figure, a second elongated member anchored at one end thereof adjacent the one side of said base at a point aligned with said one vertex of the triangular figure, said base being formed with an arcuate slot related to said one vertex as a center, means extending through said slot connecting the other ends of said elongated members for conjoint movement, means for moving said indicator means in response to pivoted movement of said first elongated member, said container being movable over the one side of said base to register the opposite ends of the column with the hypotenuse and the adjacent side of the triangular figure defining said vertex, said second elongated member being movable to a position wherein a portion thereof intersects the demarcation point between adjacent strata of the column of material in said container, thereby imparting movement to said indicator means to give a reading of the proportion of said stratified layers.

2. A device as in claim 1 and further including a carrier for said container movable over the one side of said base.

3. A device as in claim 2 and further including an elongated guide bar movably mounted on the one side of said base towards and away from said side of the triangular figure, said carrier having portions for abutting said guide bar.

4. A device as in claim 1 wherein said indicator means comprises a circular disc and said indicator moving means comprises a pinion gear on said disc and a sector gear on said first elongated member meshing with said pinion gear.

5. A device of the character described comprising a flat hollow casing, a face plate on one side of said casing, a triangular figure on the outer surface of said face plate, said face plate being formed with an arcuate slot related to one vertex of said figure as a center, an arm pivoted adjacent the inner surface of said face plate at a point aligned with said one vertex of the triangular figure, an elongated member in spaced relation to the outer surface of said face plate, one end of said elongated member being anchored on said plate at the one vertex of said triangular figure, knob means extending through said slot and fixed to the free end of said arm, the other end of said elongated member being secured to said knob means, an indicator disc rotatably mounted within said casing and carrying indicia on the marginal portions thereof, said face plate being formed with a window opening opposite the indicia carrying portion of said disc, and gear means connecting said disc and said arm for rotating said disc in response to pivoted movement of said arm.

6. A device as in claim 5 wherein said face plate is formed with a pair of parallel slots extending toward the sides of said triangular figure defining the one vertex thereof, a guide bar on the outer surface of said face plate, slotted guide means adjacent the inner surface of said face plate, guide members movable in said slotted guide means, and means connecting said guide members with said guide bar, said last mentioned means passing through said parallel slots.

7. A device of the character described comprising a flat, hollow, rectangular casing, a face plate on said casing, a circular indicator disc within said casing, means for rotatably mounting said disc including a pinion gear, an arm within said casing, means for pivotally mounting one end of said arm, said face plate being formed with an arcuate slot related to the pivot point of said arm as a center, knob means attached to the other end of said arm and passing through said slot, wire means located in spaced relation to the outer face of said plate, said wire means being anchored at one end thereof to said face plate at a point aligned with the pivot point of said arm, the other end of said wire means being fixed to said knob means, a sector gear on said arm and in mesh with said pinion gear, said face plate bearing on the outer surface thereof a triangular figure with one vertex thereof coincident with the anchor point of said wire, said meshing gears having a gear ratio operative to cause a single revolution of said indicator disc in response to pivoted movement of said arm over an angle subtended by the sides adjacent the one vertex of said triangular figure, said indicator disc being marked with indicia at the margin thereof and said face plate being formed with a window opposite the indicia carrying portion of said disc.

8. For use with a proportion measuring device of the character described, a tube carrier comprising a flat member having an upstanding intermediate portion, laterally spaced leg portions at the lower end of said intermediate portion and on opposite sides thereof, a top portion projecting laterally from the upper end of said intermediate portion, said top portion and the lower end of said intermediate portion being formed with aligned tube receiving grooves.

9. A tube carrier as in claim 8, wherein one side edge of said intermediate portion adjacent said grooves is formed with a cutout to provide a space between said side edge and the axis of said grooves.

10. A tube carrier as in claim 8 wherein said member is transversely grooved along a line between one leg portion and said intermediate portion.

11. A device for measuring the relative proportions of at least two stratified layers of a column of material in a tubular container of uniform cross section, comprising a flat base member, a base line on the outer surface of said member, a line extending from one end of said base line and at an angle thereto to form a figure having a vertex at one end thereof, an elongated gauging member anchored at one end thereof at the vertex of said figure and having movement over the base member between the lines of said figure, carrier means for said container movable laterally over the outer surface of said base member and including means for disposing said container at right angles to said base line, means on said base member engageable with said carrier means for maintaining said container at right angles to said base line throughout the lateral movement of said carrier means, said carrier means being movable to positions wherein the bottom and top levels of the column within said container register in intersecting relation to said first and second mentioned lines respectively, said gauging member being movable into intersecting relation to the demarcation of the strata in the column of material in said container, and direct reading indicator means on said base member movable to provide a reading coordinated with the angular position of said gauging member.

12. A device as in claim 11 wherein said carrier means comprises a flat member formed with a groove in the upper face thereof for slidably receiving therein said container.

References Cited in the file of this patent

UNITED STATES PATENTS

| | | |
|---|---|---|
| 430,084 | Paine | June 10, 1890 |
| 581,472 | Shaver | Apr. 27, 1897 |
| 806,819 | Mattson | Dec. 12, 1905 |
| 1,195,212 | Hall | Aug. 22, 1916 |
| 1,435,389 | Gross | Nov. 14, 1922 |
| 1,643,426 | Sutherland | Sept. 27, 1927 |
| 1,980,930 | Reyniers | Nov. 13, 1934 |
| 2,741,913 | Dovas | Apr. 17, 1956 |
| 2,750,671 | Jones | June 19, 1956 |
| 2,831,252 | Weichselbaum | Apr. 22, 1958 |
| 2,840,915 | Drummond et al. | July 1, 1958 |

FOREIGN PATENTS

| | | |
|---|---|---|
| 32,049 | Norway | Mar. 29, 1921 |
| 937,335 | France | Mar. 8, 1948 |